US008533774B2

(12) United States Patent
Zielinski et al.

(10) Patent No.: US 8,533,774 B2
(45) Date of Patent: Sep. 10, 2013

(54) CONTROLLED SHARING OF INFORMATION IN VIRTUAL ORGANIZATIONS

(75) Inventors: Marek Piotr Zielinski, Pretoria (ZA); Jan Harm Petrus Eloff, Pretoria (ZA)

(73) Assignee: SAP AG, Walldorf (DE)

( * ) Notice: Subject to any disclaimer, the term of this patent is extended or adjusted under 35 U.S.C. 154(b) by 375 days.

(21) Appl. No.: 12/954,037

(22) Filed: Nov. 24, 2010

(65) Prior Publication Data

US 2012/0131581 A1     May 24, 2012

(51) Int. Cl.
*G06F 17/00* (2006.01)

(52) U.S. Cl.
USPC .......... 726/1; 726/2; 726/27; 713/150; 718/1; 718/100

(58) Field of Classification Search
USPC ................ 726/1, 2, 27; 718/1, 100; 713/150
See application file for complete search history.

(56) References Cited

U.S. PATENT DOCUMENTS

| | | | |
|---|---|---|---|
| 6,307,822 B1 * | 10/2001 | Shim et al. ................. | 369/47.18 |
| 7,308,706 B2 * | 12/2007 | Markham et al. ................. | 726/4 |
| 7,594,262 B2 * | 9/2009 | Hanzlik et al. ................. | 726/15 |
| 7,669,228 B2 * | 2/2010 | Moon et al. ................. | 726/1 |
| 7,684,806 B2 * | 3/2010 | Ovadia et al. ................. | 455/450 |
| 2004/0044908 A1 * | 3/2004 | Markham et al. ............. | 713/201 |
| 2008/0028472 A1 * | 1/2008 | Faisman et al. ................. | 726/27 |

OTHER PUBLICATIONS

Varun Gupta, "Chinese Wall Security Policy", San Jose State University, Dec. 2009.*
Martin Abadi, Michael Burrows, Butler Lampson, and Gordon Plotkin, "A Calculus for Access Control in Distributed Systems." ACM Trans, Program. Lang. Syst. 15, 4, pp. 706-734, Sep. 1993.
Francesco Bonchi, Bradley Malin, and Yücel Saygin, "Recent Advances in Preserving Privacy when Mining Data." Data and Knowledge Engineering, 65(1), pp. 1-4. May 2007.
Dr. David F.C. Brewer and Dr. Michael J. Nash, "The Chinese Wall Security Policy." Proceedings of the IEEE Symposium Research in Security and Privacy, May 1-3, 1989, Oakland California, pp. 206-214.
Luis M. Camarinha-Matos, Hamideh Afsarmanesh, Nathalie Galeano, and Arturo Molina, "Collaborative networked organizations—Concepts and practice in manufacturing enterprises." Computers and Industrial Engineering. 2009.
Christopher D. Cera, Taeseong Kim, Junhyun Han, and William C. Regli, "Role-Based Viewing Envelopes for Information Protection in Collaborative Modeling." Computer Aided Design 36(9):873-886, 2004.

(Continued)

*Primary Examiner* — April Y Blair
(74) *Attorney, Agent, or Firm* — Fountainhead Law Group PC

(57) ABSTRACT

In one embodiment, a method for extracting data items for a task requesting a set of data items in a virtual organization including a plurality of members is provided. A set of confidentiality sub-policies associated with the set of data items and an information utility sub-policy associated with the task are retrieved. At least a portion of the set of data items for the task are retrieved based on an analysis that optimally balances confidentiality and information utility using the set of confidentiality sub-policies and the information utility sub-policy.

20 Claims, 5 Drawing Sheets

(56) References Cited

OTHER PUBLICATIONS

Benny Chor, Oded Goldreich, Eyal Kushilevitz and Madhu Sudan, "Private Information Retrieval." Journal of the ACM, 45(6), pp. 965-982. Nov. 1998.

Shirley Crompton, Benjamin Aziz, Michael Wilson, Alvaro Arenas, Brian Matthews, "Requirements Specification for the Sharing Sensitive Scientific Data Test Bed." Deliverable 6.1, Consequence Project No. 214859, FP7, available at: www.consequence-project. eu/, 2008.

Josep Domingo-Ferrer and Yücel Saygin, "Recent Progress in Database Privacy." Data and Knowledge Engineering 68(11): 1157-1159. 2009.

Josep Domingo-Ferrer, "A Three-Dimensional Conceptual Framework for Database Privacy." in Secure Data Management-4th VLDB Workshop SDM '2007, pp. 193-202, 2007.

Josep Domingo-Ferrer, Vicenç Torra, "Ordinal, Continuous and Heterogeneous k-Anonymity Through Microaggregation." Data Mining and Knowledge Discovery. 11 195-212. 2005.

Dakshi Agrawal and Charu C. Aggarwal, "On the design and quantification of Privacy Preserving Data Mining Algorithms." In Proceedings of the 20th ACM SIGMOD-SIGACT-SIGART symposium on Principles of database systems, pp. 247-255. Santa Barbara, CA, 2001.

David F. Ferraiolo and D. Richard Kuhn, "Role-Based Access Controls." 15th National Computer Security Conference, pp. 554-563, Oct. 12-16, 1992.

David F. Ferraiolo, John F. Barkley, and D. Richard Kuhn, "A Role-Based Access Control Model and Reference Implementation Within a Corporate Intranet." ACM Transactions on Information and System Security, vol. 2(1), pp. 34-64. Feb. 1999.

David F. Ferraiolo, Ravi Sandhu, Serban Gavrila, and D. Richard Kuhn and Ramaswamy Chandramouli, "Proposed Nist Standard for Role-Based Access Control." ACM Transactions on Information and System Security, vol. 4(3), pp. 224-274. Aug. 2001.

Junghyun Han, Taeseong Kim, Christopher D. Cera, and William C. Regli, "Multi-Resolution Modeling in Collaborative Design." in 18th International symposium on Computer and Information Sciences. 2003.

Qi Li, Xinwen Zhang, Mingwei Xu, Jianping Wu, "Towards Secure Dynamic Collaborations with Group-Based RBAC model." Computer & Security, Elsevier, pp. 260-275, 2008.

Yehuda Lindell and Benny Pinkas, "Privacy Preserving Data Mining." Journal of Cryptology, 15(3), pp. 177-206. 2002.

Li Liu, Murat Kantarcioglu, Bhavani Thursisingham, "The Applicability of the Perturbation based Privacy Preserving Data Mining for Real-World Data." Data and Knowledge Engineering, 65(1), pp. 5-21. 2008.

Grigorios Loukides and Jianhua Shao, "Data Utility and Privacy Protection Trade-off in K-Anonymisation." Proceedings of the 2008 International Workshop on Privacy and Anonymity in Information Society, Nantes, France, pp. 36-45. Mar. 29, 2008.

Emmanuouil Magkos, Manolis Maragoudakis, Vassilis Chrissikopoulos, Stefanos Gritzalis, "Accurate and Large-Scale Privacy-Preserving Data Mining Using the Election Paradigm." Data and Knowledge engineering, Apr. 13, 2009.

B. Nasser, R. Laborde, A. Benzekri, F. Barrere, M. Kamel, "Access Control Model for Inter-Organizational Grid Virtual Organizations." 2005.

Rafail Ostrovsky and William E. Skeith III, "A Survey of Single-Database PIR: Techniques and Applications." in Public Key Cryptograph—PKC pp. 393-411, 2007.

Jaehong Park and Ravi Sandhu, "Towards Usage Control Models: Beyond Traditional Access Control." 7th Proceedings of the ACM Symposium on a Access Control Models and Technologies, ACM, NY, pp. 57-64, Jun. 2002.

Ravi S. Sandhu, "Lattice-Based Access Control Models." IEEE Computer Society Press, Los Alamitos, CA, 26(11), pp. 9-19, Nov. 1993.

Ravi S. Sandhu, Edward J. Coyne, Hal L. Feinstein, and Charles E. Youman, "Role-Based Access Control Models." IEEE Computer, 19(2), pp. 38-47, Feb. 1996.

William Tolone, Gail-Joon Ahn, Tanusree Pai, and Seng-Phil Hong, "Access Control in Collaborative Systems." ACM Computing Surveys, 37(1), pp. 29-41, Mar. 2005.

Jaideep Vaidya and Chris Clifton, "Leveraging the 'MULTI' in Secure Multi-Party Computation." Proceedings of the 2003 ACM Workshop on Privacy in the Electronic Society, Oct. 30, 2003.

Yan Wang and Bart O. Nnaji, "Document-Driven Design for Distributed CAD Services in Service-Oriented Architecture." Journal of Computing and Information Science in Engineering, 6(2), pp. 127-138, Jun. 2006.

Andrew C. Yao, "Protocols for Secure Computations." Proceedings of the 23rd Annual Symposium on Foundations of Computer Science, IEEE Computer Society, pp. 160-164, 1982.

Bin Zhao, "Collaborative Access Control." T-110.501 Seminar on Network Security 2001, Telecommunications Software and Multimedia, TML-C7, Helsinki University of Technology, 2001.

Chris Clifton, Murat Kantarcioglu, and Jaideep Vaidya, "Privacy-Preserving Data Mining." In WW Chu, ' Ty Lin (Eds.) Foundations and Advances in Data Mining, pp. 313-244. 2005.

Jean Bacon, Ken Moody, "Access Control in Distributed Systems." Monographs in Computer Science, Computer Systems, theory, Technology and Applications, SpringerLink, NY, USA, pp. 21-28, 2006.

Hyung-Chang Kim, R.S. Ramakrishna, and Kouichi Sakurai, "A Collaborative Role-Based Access Control for Trusted Operating Systems in Distributed Environment." IEICE, Trans. Fundamentals, Communications, Computer Society, vol. E88(1), pp. 270-279. Jan. 2005.

Duhwan Mun, Jinsang Hwang, Sooonhung Han, "Protection of Intellectual Property based on a Skeleton Model in Product Design Collaboration." Computer Aided Design, 41(9) pp. 641-648, 2009.

M. Eloff Loock, J.H.P. Heidema, J., and T. Valentin, "Conflict-Based Access Control for Data-Mining Environments." (Submitted for publication) 2010.

D. Elliott Bell and Leonard J. LaPadula, "Secure Computer Systems: Mathematical Foundations." MITRE Technical Report No. 2574, vol. 1, Mar. 1973.

Josep Domingo-Ferrer, Maria Bras-Amoros, Qianhong, Wu, Jesus Manjon, "User-private information retrieval based on a peer-to-peer community." Data & Knowledge Engineering, 68(11), pp. 1237-1252, 2009.

F. Emekci, O.D. Sahin, D. Agrawal, A. El Abbadi, "Privacy Preserving Decision Tree Learning over Multiple Parties." Data & Knowledge Engineering, 63(2), pp. 348-361. Mar. 2007.

Marek P. Zielinski and Martin S. Olivier, "On the use of economic price theory to find the optimum levels of privacy and information utility in non-perturbative microdata anonymisation." Data & Knowledge Engineering, 69(5), pp. 399-423. Oct. 2010.

Weijia Yang and Shangteng Huang, "Data Privacy Protection in Multi-Party Clustering." Data & Knowledge Engineering, 67(1), pp. 185-199. Jun. 2008.

Z.M. Qiu, Y.S. Wong, J.Y.H. Fuh, Y.P. Chen, Z.D.Zhou, W.D. Li, and Y.Q. Lu, "Geometric model simplification for distributed CAD." Computer Aided Design 46(5), pp. 809-819. 2004.

Alex Gurevich and Ehud Gudes, "Privacy Preserving Data Mining Algorithms." 10th International Database Engineering and Applications Symposium, 2006.

A.M.M.S. Ullah, "A Fuzzy Decision Model for Conceptual Design." Systems Engineering, 8(4), pp. 296-308. 2005.

\* cited by examiner

CONTROLLED SHARING OF INFORMATION IN VIRTUAL ORGANIZATIONS

BACKGROUND

Particular embodiments generally relate to controlled sharing of information.

Unless otherwise indicated herein, the approaches described in this section are not prior art to the claims in this application and are not admitted to be prior art by inclusion in this section.

Whole products are rarely designed entirely by a single company. Instead, companies are increasingly focusing on collaborative product development. In a collaborative product development approach, each company focuses on only its core activity and competence, whilst collaborating with other companies for other activities about the components that make up a product. For example, a number of different part suppliers can design components and collaborate on the way in which these components should be integrated into the overall product. In this scenario, each company works with its own intellectual property, such as the design of a component, but also participates in the assembly of the final product. In such as collaborative product development environment, information dealing with intellectual property rights needs to be shared as well as protected.

To enable collaborative product development, a Virtual Organization (VO) may be established among the collaborating companies. A VO represents a temporary alliance of independent organizations (which may include small, medium, and large organizations) that come together to share skills and resources in order to achieve a common goal.

A VO typically has a number of stages or phases in its life cycle. These stages include:
1. Creation, during which the initiation, recruiting, strategic planning and incubation of the VO takes place,
2. Operation, during which the intensive knowledge exchange process for the different collaboration models in a VO occur,
3. Evolution, during which small changes in roles, membership or operating principles may occur, and
4. Dissolution, which occurs once the objective of the VO has been completed and the VO is dissolved.

When an enterprise joins a VO, it brings with it knowledge about itself and about collaboration which it has evolved through experience over time. In addition, if a VO is established to support collaborative development, then each member of a VO brings with it information that is part of its core intellectual property (IP) (e.g. design blue prints).

One of the needs for the successful formation and operation of VOs is the need to apply enterprise and VO knowledge in the operational and strategic decision making of VOs. During all the stages of a product or service lifecycle, certain information and knowledge, which may deal with intellectual property, are used to guide the operational and strategic decision making of an organization. For example, in collaborative product development, decisions need to be made on the correct shape and positioning of a component relative to other components. For this purpose, a company designing a certain component may require CAD (Computer Aided Design) data of other components, which were designed by other collaborating companies. An inconsistent or sub-optimal decision making in the product design stage could lead to a sub-optimal design of the final product. This can significantly reduce the competitiveness and profitability of the collaborating organisations.

If a VO model is used for collaborative product development, then the problem of inconsistent or sub-optimal decision making in the product design stage is more acute. That is, each member in a VO will most likely have a local interest. Therefore, decisions taken by members in a VO may be decisions that are only locally optimal, without a complete understanding of the impact of the decisions on the VO as a whole (e.g. without understanding how a decision impacts on the final product developed by the VO). Even if decision making in the VO may take into account the interests of the VO as a whole, such decision making may be nevertheless based upon partial knowledge of the VO capabilities and constraints as a whole. Therefore, the knowledge within a VO may not be fully exploited to inform such strategic and operational decision processes.

During the collaborative design of a product or a component, certain design information (e.g. CAD data), which forms part of a partner's intellectual property (IP), needs to be shared among the partners of the VO. As mentioned previously, collaborating partners may be reluctant to share confidential information, because of concerns related to the unfair exploitation of that information. Different approaches to promote sharing of this sensitive information may be provided, which include controlling of access rights, design model simplification, as well as data watermarking.

Controlling access rights of users to specific IP can be enforced through authentication and authorization. As the level of authentication was stronger, the sensitivity level of the information to with a user had access was increased.

Design model simplification aims to protect confidentiality of design information by providing a design model with different levels of detail. Different levels of detail are available to different users, based on their access rights. Nevertheless, it is difficult to apply a simplified parts model in the collaborative design of products because the topological entities of components are lost during the simplification process.

Lastly, digital data watermarking is also a method that is used in the protection of IP. However, this technique is appropriate for assuring the authenticity of information and also for assuring that the design data retains its original form. Therefore, watermarking does not address the challenge of ensuring information confidentiality in the context of a VO.

Information privacy may also be taken into account. Information privacy may have three dimensions:
Respondent privacy focuses on the prevention of re-identification and disclosure of confidential information of the respondents whose records are released.
User privacy aims to protect the privacy of queries to interactive databases, in order to prevent user profiling and re-identification.
Owner privacy concentrates on ensuring that only the results of a task (e.g. a query), are revealed, without revealing the information that was used to carry out the task.

In the protection of owner privacy, privacy-preserving data mining and secure multiparty computation may be performed. Privacy-preserving data mining may be appropriate for cases where data mining techniques are performed on data to derive new knowledge. Secure multiparty computation can be used to protect confidentiality of information by allowing computations to be made on sensitive information such that only the result of the computation is revealed, without revealing the sensitive information itself. However, secure multiparty computation requires considerable computation and communication overhead. This makes secure multiparty computation inefficient for large inputs, as, for example, in cases where detailed design information is shared. In addition, sometimes it may be required to actually reveal some of the information of a component's design to ensure that other components (that use or interact with the given component) are designed appropriately. Secure multiparty computation is unable to address this requirement.

Access control may be used to protect information privacy. For example, access control started with Mandatory Access Control (MAC) and Discretional Access Control (DAC). Also, Role-Based Access Control (RBAC) has emerged as an extension of DAC and MAC by emphasizing separation of duties.

Also, a Chinese Wall Security Policy (CWSP) model addresses access control requirements in a commercial environment focusing on conflicts of interest. The concept of a conflict of interest is applicable in a VO where enterprises are exposed to each others' information, especially when sharing information dealing with intellectual property rights. The foundation of the Chinese Wall Security Policy model is that users, enterprises in a VO, are allowed access only to information that is not in conflict with any other information that they already have access to. The CWSP model builds a collection of impassable walls, called Chinese walls, around the data sets of conflicting companies.

SUMMARY

In one embodiment, a method for extracting data items for a task requesting a set of data items in a virtual organization including a plurality of members is provided. A set of confidentiality sub-policies associated with the set of data items and an information utility sub-policy associated with the task are determined. At least a portion of the set of data items for the task are retrieved based on an analysis that balances confidentiality and information utility using the set of confidentiality sub-policies and the information utility sub-policy.

In one embodiment, a set of conflict control sub-policies for members associated with the set of data items and a first member associated with the task is determined. It is determined if a conflict exists between members associated with the set of data items and the first member using the set of conflict control sub-policies. The at least a portion of the set of data items are not retrieved if the conflict exists.

In one embodiment, the set of conflict control sub-policies includes a conflict control policy associated with each of the members associated with the set of data items and a conflict control sub-policy associated with the first member.

In one embodiment, an optimum level of information utility and confidentiality is determined based on the set of confidentiality sub-policies and the information utility sub-policy for the task.

In another embodiment, a non-transitory computer-readable storage medium containing instructions for extracting data items for a task requesting a set of data items in a virtual organization including a plurality of members is provided. A set of confidentiality sub-policies associated with the set of data items and an information utility sub-policy associated with the task are determined. At least a portion of the set of data items for the task are retrieved based on an analysis that balances confidentiality and information utility using the set of confidentiality sub-policies and the information utility sub-policy.

In another embodiment, a system for extracting data items for a task requesting a set of data items in a virtual organization including a plurality of members is provided. The system includes storage configured to store: data items for each member, and a confidentiality sub-policy for data items for each member. An information extraction component configured to: determine a balance of confidentiality and information utility based on a set of confidentiality sub-policies associated with the set of data items and an information utility sub-policy associated with the task; and retrieve at least a portion of the set of data items based on the balancing of the confidentiality and the information utility using the set of confidentiality sub-policies and the information utility sub-policy.

The following detailed description and accompanying drawings provide a better understanding of the nature and advantages of the present invention.

DETAILED DESCRIPTION

Figure 1:
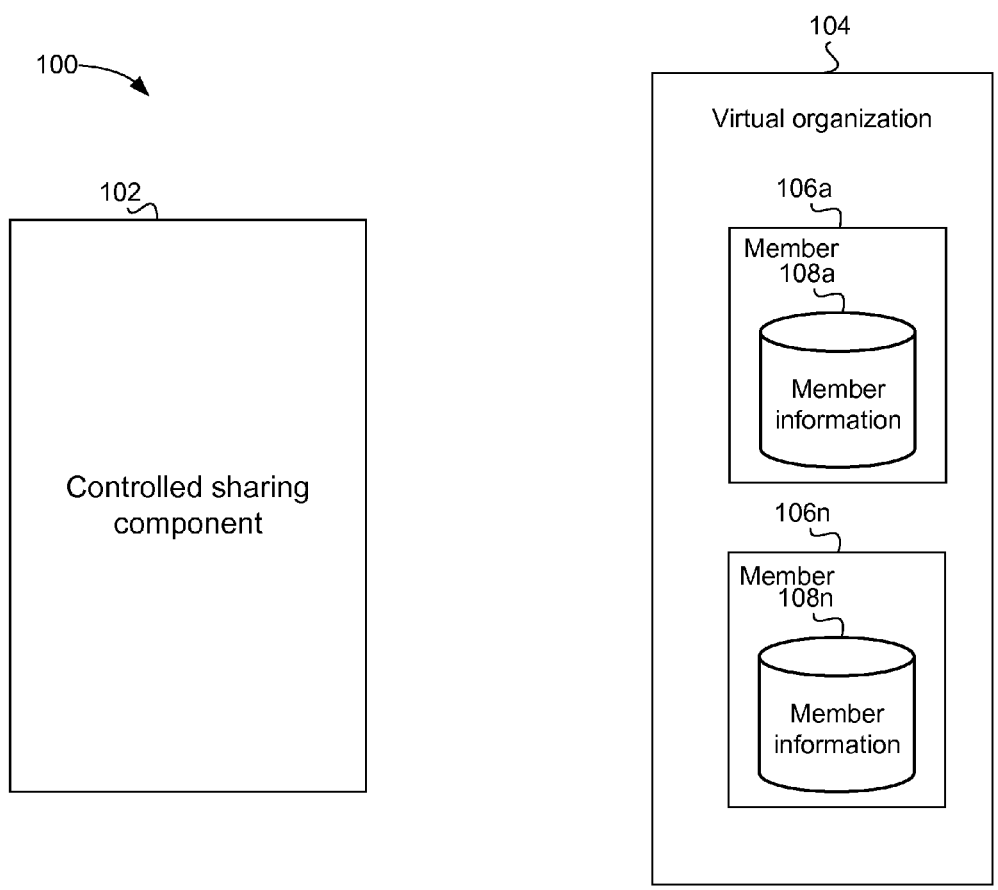
FIG. 1 depicts an example of a system for controlled sharing of information according to one embodiment.

Described herein are techniques for controlled sharing of information. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

In a virtual organization (VO), members may be reluctant to share information amongst each other due to concerns for the confidentiality of their intellectual property information and trust within the VO. For example, in collaborative product development, collaborating companies may be reluctant to disclose CAD data, since it forms part of the company's intellectual property and thus should remain confidential and be secured by appropriate measures. In addition, members of a VO may not wish for their sensitive information to be accessed by other members, since it may, for example, allow one to gain insight into the way in which a member's processes are operated, which could be unfairly exploited.

Particular embodiments assure members of a VO that the confidentiality of their intellectual property information and knowledge is maintained. Then, members of a VO might become less reluctant to share information and knowledge. This may lead to enhanced operational and strategic decision making in a VO, which may improve the competitiveness and profitability of the VO. It may also lead to an enhanced control of the VO, leading to more effective market exploitation.

Particular embodiments provide a balance between confidentiality and information utility. As the design being developed by the VO, it is simplified in order to preserve confidentiality, and the usefulness of the design is decreased. Therefore, particular embodiments attempt to determine an optimum balance (or the best balance given under a given set of circumstances) between confidentiality and information utility when sharing IP. If the level of confidentiality is too high, the shared information may not be sufficiently useful for the purpose or task for which it is shared. Therefore, the quality of the result of the task may be significantly reduced if the shared information does not have sufficient information utility. On the other hand, if the confidentiality level of the shared information is too low, then the information can be used to infer confidential information.

In one embodiment, a conflict control model is used to determine conflicts. For example, each member creates its own view of the world by defining the members it is in conflict with, this is done on an on-going manner during the operation of the VO.

In a VO, the members may be enterprises or companies that are in competition either within or outside of the VO. Enterprises could be in competition because they operate in the same domain space manufacturing similar or the same products. For example, consider enterprise A and B both operating in the automobile industry. Enterprise A designs car doors for model 1 and enterprise B designs car doors for model 2. There is competition between enterprise A and B that may create a conflict of interest. Users from both enterprise A and B may be prevented from accessing each other's blue-print designs because it involves IP related material and because they are in competition. However, particular embodiments facilitate the exchange of sensitive information within the VO to avoid conflict of interest in a dynamic and controlled manner between the enterprises. Due to the dynamic nature of VOs and changing business opportunities, it is possible that enterprise A may decide to discontinue the design of car doors and change its strategy to start focusing on the design of tires for model 1. At that point enterprise A is no longer in conflict with enterprise B and hence particular embodiments are flexible to cater for such dynamism.

FIG. 1 depicts an example of a system 100 for controlled sharing of information according to one embodiment. System 100 includes a controlled sharing component 102 and a virtual organization 104. Virtual organization 104 includes a plurality of members 106a-n. Members 106 may be enterprises, such as companies, that form the virtual organization. The virtual organization may be a collaboration of members 106 to produce a product.

Each member 106 may include member information that is stored in a storage device 108. Member information may be information that may be subject to the member's own intellectual property. Member information may include a number of data items. A data item may be a type of information, such as design documents. As will be described in more detail below, member information may be subject to conflicts of interest between members 106 and also confidentiality.

Controlled sharing component 102 controls sharing of member information between members 106. As will be discussed in more detail below, controlled sharing component 102 provides controlled sharing based on a sharing policy. For example, members 106 can dynamically control or decide the type of information that can be shared, the level of detail of the shared information, the purpose (task of VO 104) for which information can be shared, and the conflict control sub-policy of each member 106. The purpose relates to specific tasks that are performed during different stages of the lifecycle of VO 104. For example, the tasks may request data items from members 106.

Controlled sharing component 102 uses a sharing policy to ensure prevention of a conflict of interest and also ensure the optimum balance between information utility and confidentiality. In one embodiment, the sharing policy includes three components of a conflict control sub-policy, a confidentiality sub-policy, and an information utility sub-policy.

The conflict control sub-policy is used by members 106 to specify other members 106 with whom each member is in conflict with or not in conflict with. For example, a first member 106a may specify that it is in conflict with a second member 106n. This may ensure that conflicts of interest among members 106 are prevented.

The confidentiality sub-policy specifies the confidentiality for member information. The confidentiality of member information may be preserved. For example, the type and amount of shared member information as well as the purpose for which it is shared is taken into account. In one example, member information may be classified in data items. For each data item, the confidentiality sub-policy may provide a minimum confidentiality value. The value may indicate a minimum level of confidentiality required for the data item. Other granularities that define confidentiality may be used. For example, a data item may be a piece of information (e.g., a specific CAD drawing for a part), a type of information (e.g., CAD drawings), or a combination of each.

In one example, the way in which the confidentiality is measured for the specific data item is defined. Each member's preference for confidentiality for each data item may be specified with a sensitivity level. For example, not all data items may have the same sensitivity level. Thus, each member 106 may provide a sensitivity level or preference for the confidentiality of each data item. This ensures that what members 106 consider the most sensitive data items are provided the highest levels of confidentiality protection. Also, the minimum level of confidentiality for the type of information may be specified. Further, the task for which a given type of information may be classified.

The information utility sub-policy may specify requirements that are used to determine the utility of member information. The information utility quantifies utility for a data item and also may specify a minimum level of utility required by the task for the data item. This ensures the shared member information is of a sufficient quality (i.e., utility) to enable the effective execution of tasks for VO 104 for which the information is shared. Therefore, a type of information that most significantly impacts the result of a given task may have the highest preference. The information on the utility aspect (e.g., accuracy) of the type of information may be preserved as much as possible.

The above policies may be changed dynamically (e.g., on the fly) by members 106 throughout the life cycle of VO 104.

Figure 2:
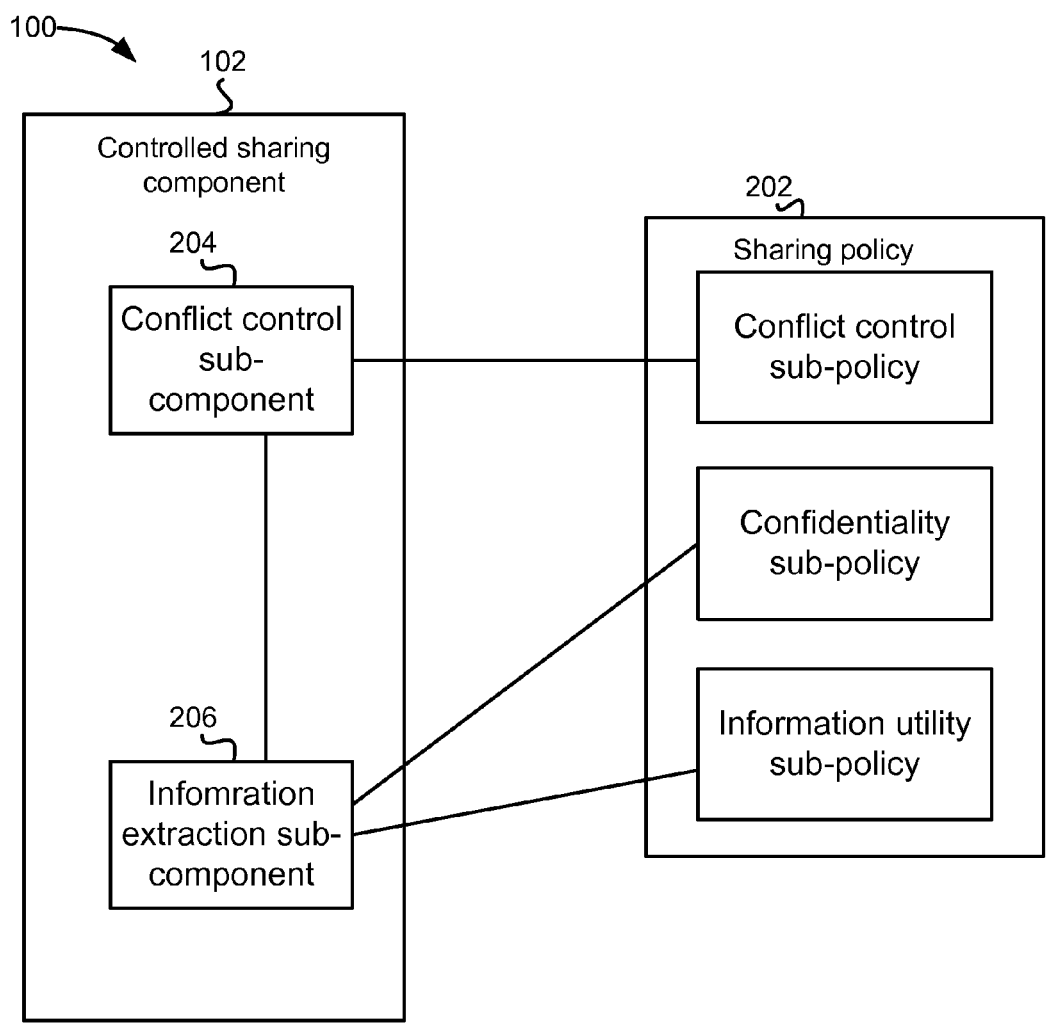
FIG. 2 depicts a more detailed example of controlled sharing component and policies according to one embodiment.

FIG. 2 depicts a more detailed example of controlled sharing component 102 and policies 202 according to one embodiment. As shown, controlled sharing component 102 includes a conflict control sub-component 204 and an information extraction sub-component 206. Conflict control sub-component 204 ensures that a conflict of interest among members 106 is taken into account when sharing different data items. Information extraction sub-component 206 extracts information from different members 106 in such a way that an optimum balance between confidentiality and information utility exists.

Conflict control sub-component 204 and information extraction sub-component 206 may interact with sharing policy 202. In one embodiment, conflict control sub-component 204 may use the conflict control sub-policy. Also, information extraction sub-component 206 may use the confidentiality sub-policy and information utility sub-policy.

Conflict control sub-component 204 attempts to avoid conflicts of interest among members 106 during sharing of information. In one embodiment, conflict control sub-component 204 assumes that each member 106 is autonomous and makes decisions about its own view of the world. In this way, each member 106 is responsible itself for setting its own conflict control sub-policy. The conflict control sub-policy for each member 106 may include a list of other members 106 with which the member 106 is in conflict or not in conflict with. The list may be maintained in a conflict control sub-policy for each member 106. Each member 106 may dynamically change and broadcast at run time, in a private or confidential way, to other members 106 a list of which members 106 it is in conflict with or with whom it is not in conflict with. A list may be stored but may not be disclosed to other members 106.

In one embodiment, conflict control sub-component 204 may avoid conflicts of interest by creating dynamic direct and indirect conflict of interest classes based on each member's 106 view of the world. The direct conflict class may be where one company lists another company with which it is in conflict. An indirect conflict class may be where a conflict occurs through another member 106. Also, access usage patterns based on historical access data are evaluated in determining a conflict. For example, if a member's information has been accessed for a particular type of task, then it may be determined that there is not a conflict of interest for a same type of task. The security level of the conflict may also be managed. For example, if a lower security level is determined as a conflict, then it might be more likely that a conflict of interest is not determined.

Roles may be used to determine the conflict of interest. Each member 106 may have different users, which may be assigned different roles within conflict control sub-component 204. For each user to access the sensitive information of other members 106, the user may have to possess a required role along with appropriate usage roles to avoid a conflict of interest. The implementation may include access control lists (ACL) for members 106. The conflict control sub-policies may be continuously updated.

Information extraction sub-component 206 is used to extract information from members 106. Information extraction sub-component 206 tries to attain an optimum balance between confidentiality and information utility in extracting the member information.

The confidentiality and information utility may be quantified for different data items. Different data items may need to be shared in a virtual organization 104. For example, each data item may be different types of data item. Accordingly, different ways of measuring the confidentiality of information utility may be needed. For example, confidentiality and information utility may be quantified for every data item that may be shared in virtual organization 104. Also, a group of data items may be quantified together with the same confidentiality and/or information utility value.

In one embodiment, two types of sub-policies may be used to determine the optimum balance between confidentiality and information utility. For example, the confidentiality sub-policy and the information utility sub-policy are used. Constraints found in the confidentiality sub-policy and the information utility sub-policy are used to maximize both confidentiality and information utility. The balancing may be dependent upon the constraints and if the balance is considered inadequate (e.g., the results of a task are not of desired quality), then members 106 may consider changing the confidentiality and/or information utility policies to meet the desired quality of the task results. This process will be described in more detail below.

Figure 3:
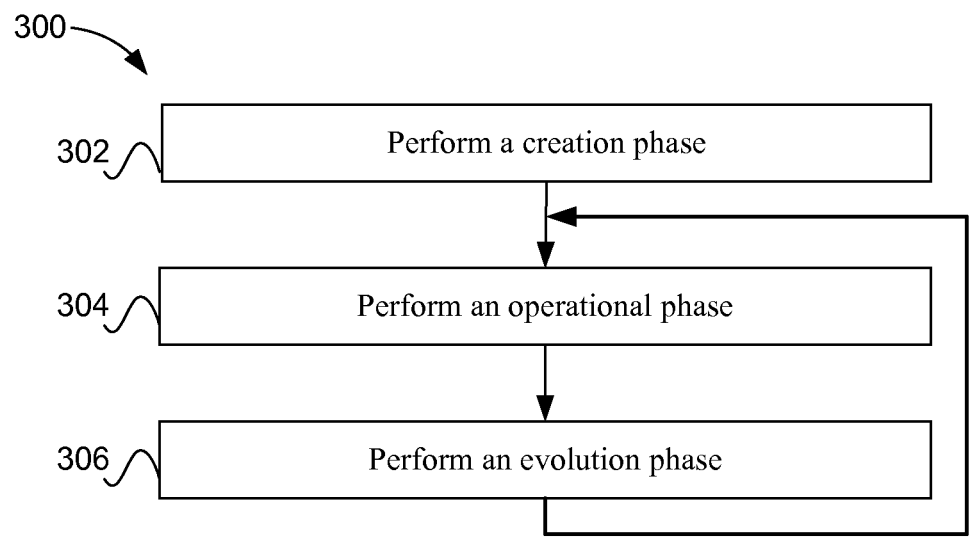
FIG. 3 depicts a simplified flowchart of the lifecycle of a virtual organization according to one embodiment.

FIG. 3 depicts a simplified flowchart of the lifecycle of virtual organization 104 according to one embodiment. At 302, a creation phase of virtual organization 104 is performed. In the creation phase, sharing policy 202 may be created. In one example, the conflict control sub-policy, confidentiality sub-policy, and information utility sub-policy are created.

At 304, an operational phase of virtual organization 104 is performed. In the operation phase, tasks may be performed for information sharing. A task may involve a step in a design process of a product or service. For example, a task is integrating a water pump with a dishwasher. Sharing policy 202 may be used to prevent conflicts of interest, and ensure that the optimum balance between information utility and confidentiality is maintained. During the operation phase, some policies may be changed by members 106. The operation phase will be described in more detail below.

At 306, the evolution phase of virtual organization 104 is performed. In the evolution phase, three sub-policies used by controlled sharing component 102 may be updated dynamically. For example, if an additional member 106 joins virtual organization 104, each member's conflict control sub-policy may be updated. Then, the conflict control sub-policy for each member may be updated to indicate if any conflicts of interest exist for the new member 106. Also, when additional data items are created in virtual organization 104, each member may create a new confidentiality sub-policy for the new data item. Also, if additional tasks are created in virtual organization 104, a new information utility sub-policy is created for the new task.

Figure 4:
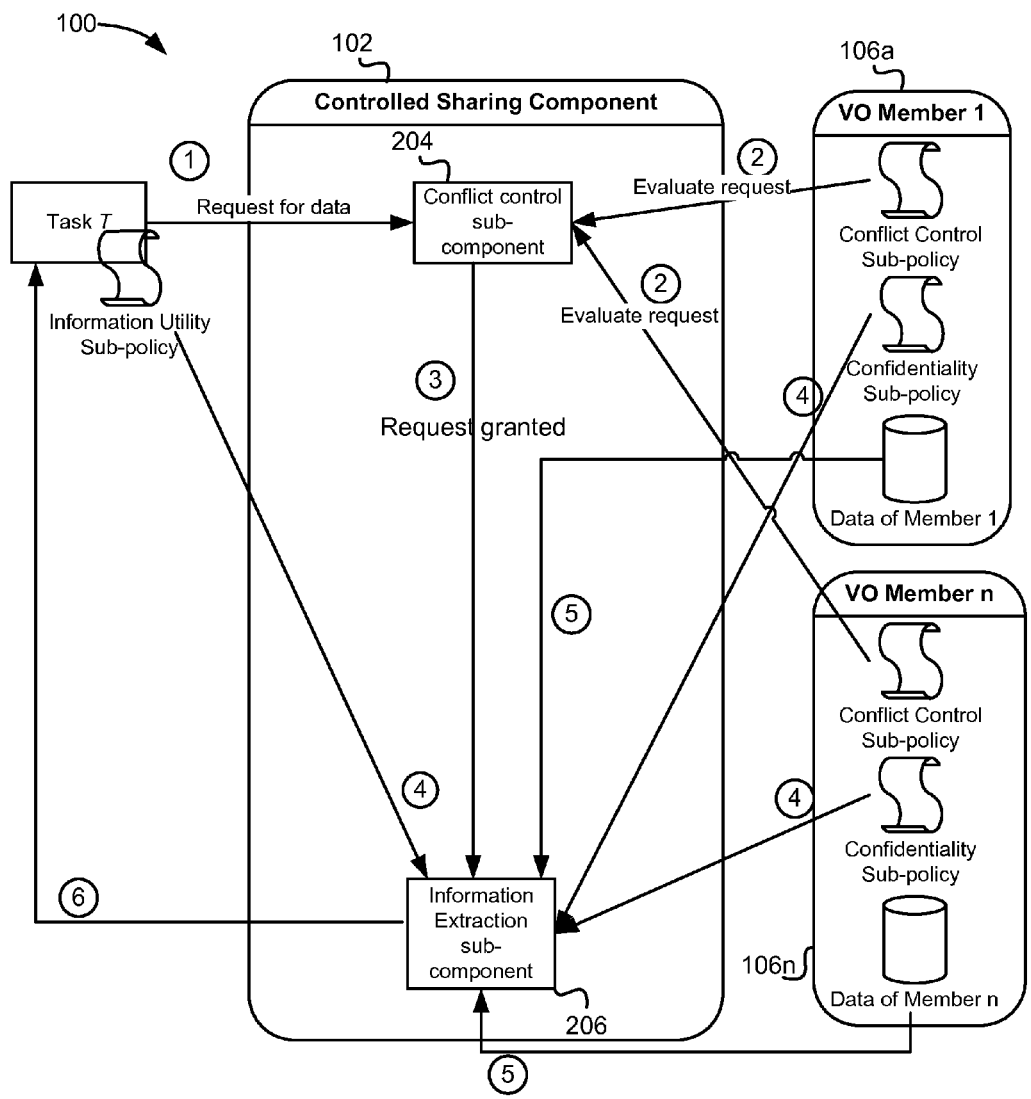
FIG. 4 depicts an example showing the operation of the system according to one embodiment.

The operation phase of virtual organization 104 will now be described in more detail. FIG. 4 depicts an example showing the operation of system 100 according to one embodiment. At 1, a task T needs to be performed at virtual organization 104. The task may be requesting a certain data item and include an information utility sub-policy for the task. For example, an information utility sub-policy may be defined for the specific task.

The request for data is received at conflict control sub-component 204. At 2, given the data item required by the task, conflict control sub-component 204 determines if the task can be performed in such a way that a conflict of interest is prevented. For example, a conflict control sub-policy is used. As shown, conflict control sub-policies for members 106*a*-106*n* may be used. Although conflict control sub-policies for each member 106 may be used, only a portion of conflict control sub-policies may be used, such as the conflict control sub-policies for members 106 that are associated with data items requested by the task.

In looking for a conflict, conflict control sub-component 204 may determine if the member requesting the information is in conflict with any other members that would be supplying the member information. For example, the task may require data items from a set of companies. If any of those members have a conflict with the requesting member, then a conflict exists.

If a conflict of interest is present, then the operation of the task may be rejected and no information is extracted. In other embodiments, a work-around for the conflict of interest may be performed. For example, a work-around may send messages to members 106 in which the conflict has occurred and ask if they would waive the conflict. Also, a portion of data items may be extracted if conflicts do not exist with every member 106. If a conflict of interest does not occur or can be prevented, then the request may be allowed.

At 3, if no conflicts are found, the request is granted and information extraction sub-component 206 may determine the optimum balance between confidentiality and information utility. For example, at 4, the confidentiality sub-policy for each data item that is required by the task as well as the information utility sub-policy of the task are retrieved. The confidentiality sub-policy may be retrieved from each member 106 of virtual organization 104 or a portion of the confidentiality policies are retrieved based on the task. Information extraction sub-component 206 uses the information utility sub-policy and confidentiality sub-policy to optimally balance which information should be extracted.

At 5, information extraction sub-component 206 extracts the required data items from members 106. The extracted data items are retrieved based on a required level of confidentiality. For example, the amount of information that is retrieved may be reduced based on the required level of confidentiality. However, the reduction is performed in such a way as to provide the optimum level of information utility. At 6, the extracted data items are then passed back to the task.

An example will now be described. It will be recognized that the example is for illustrative purposes and other methods for determining the information to extract may be used. Before performing extraction, certain preconditions may be specified. For example, certain conditions in virtual organization 104 may be required, such as the following:

a) A set of n members 106. Each member 106 is represented as $C_i$, where $1 \leq i \leq n$.
b) A set of m tasks that can be performed in virtual organization 104. Each task is represented as $T_k$, where $1 \leq k \leq m$.
c) A set of p data items that exist in virtual organization 104. This set is composed of the data items of each member 106 that is part of virtual organization 104. Each data item is represented as $D_{ij}$ where $1 \leq i \leq n$ and $1 \leq j \leq p$. The first variable, i, indicates the number of members 106 of virtual organization 104, and the second variable, j, indicates the number of the data item that exists in a particular member 106.
d) For each data item that exists in virtual organization 104, a way in which information utility and confidentiality are measured. Given a data item $D_{ij}$, its information utility is represented as $Iu(D_{ij})$ and its confidentiality is represented as $Conf(D_{ij})$.
e) For each data item that exists in virtual organization 104, a way in which the amount of information is measured. This is represented as $Info(D_{ij})$.

Given the above requirements for pre-conditions, the following may exist in virtual organization 104:

a) A set of 4 (n=4) members 106 in virtual organization 104, namely $C_1$: a company that manufactures dishwashers
$C_2$: a company that manufactures dishwashers and washing machines
$C_3$: a company that manufactures the water heating element (and associated components) that are used in dishwashers and washing machines
$C_4$: a company that manufactures the water pump (and associated components) that are used in dishwashers and washing machines.

In example virtual organization 104, companies $C_1$ and $C_2$ rely on the components made by companies $C_3$ and $C_4$ to manufacture their appliances.

b) A set of 6 (m=6) tasks that can be performed in virtual organization 104, namely $T_1$: integrate the water heating element into the dishwasher made by company $C_1$.
$T_2$: integrate the water pump element into the dishwasher made by company $C_1$.
$T_3$: integrate the water heating element into the dishwasher made by company $C_2$.
$T_4$: integrate the water pump element into the dishwasher made by company $C_2$.
$T_5$: integrate the water heating element into the washing machine made by company $C_2$.
$T_6$: integrate the water pump element into the washing machine made by company $C_2$.

In this example, "integration" refers to the integration of the different components at the design level (blue print, e.g. CAD data) of a product.

c) A set of 14 (p=14) data items that exist in virtual organization 104. The data items are as follows $D_{11}, D_{12}, D_{13}, D_{14}$. These data items refer to the items that make up the design of the dishwasher made by company $C_1$.
$D_{21}, D_{22}, D_{23}, D_{24}, D_{25}$. These data items refer to the items that make up the design of the dishwasher and washing machine made by company $C_2$.
$D_{31}, D_{32}$. These data items refer to the items that make up the design of the water heating element made by company $C_3$.
$D_{41}, D_{42}, D_{43}$. These data items refer to the items that make up the design of the water pump made by company $C_4$.

d) Definition of measurement of information may be performed by:

defining a way to measure the amount of information in the above data items. For $1 \leq i \leq 4$ and for $1 \leq j \leq 14$, $Info(D_{ij})$ is specified.

The sharing policy may then be defined. For example, the conflict control sub-policy, confidentiality sub-policy, and the conflict control sub-policy are defined.

For the conflict control sub-policy, for each company $C_i$ in virtual organization 104 (where $1 \leq i \leq n$), the conflict control sub-policy specifies a set of other companies in virtual organization 104 that $C_i$ is in conflict with. For example, for each $C_i$, the conflict control sub-policy specifies the set $\{C_j, \ldots, C_k\}$ where $1 \leq j \leq k \leq n$. In one embodiment, for the specific example, the conflict control sub-policy is then be specified as:

$\{C_1, \{C_2\}\}$: this specifies that company $C_1$ is in conflict with company $C_2$, since both companies manufacture the same type of appliance (dishwasher).
$\{C_2, \{C_1\}\}$: this specifies that company $C_2$ is in conflict with company $C_1$, since both companies manufacture the same type of appliance (dishwasher).
$\{C_3, \{\ \}\}$: this specifies that company $C_3$ is not in conflict with any other company in virtual organization 104.
$\{C_4, \{\ \}\}$: this specifies that company $C_4$ is not in conflict with any other company in virtual organization 104.

The confidentiality sub-policy may be set by each member of virtual organization 104 for each data item used in virtual organization 104. For a specific data item $D_{ij}$ of a company $C_i$, this policy may specify the following:

The company's $C_i$ preference for confidentiality for the data item $D_{ij}$. Not all data items have the same sensitivity levels. Therefore, each member 106 may provide a preference for the confidentiality of each data item, to ensure that the most sensitive data items are provided the highest levels of confidentiality protection.

To do this, company $C_i$ may distribute 100 confidentiality preference points across all its data items such that Those data items that are more confidential are allocated a higher number of points, and
All 100 confidentiality preference points are allocated.

The minimum level of confidentiality $Conf(D_{ij})$ required by company $C_i$ for data item $D_{ij}$.
A set of tasks $\{T_k\}$, where $1 \leq k \leq m$, that the data item $D_{ij}$ may be used for.

In one embodiment, the confidentiality sub-policy format is {data item, confidentiality preference points, minimum confidentiality required, set of tasks that can use the data item}. In this example, the confidentiality sub-policy is set as follows:

- {$D_{11}$, 50,25,{$T_1,T_2$}}: this specifies that data item $D_{11}$ has been allocated 50 confidentiality preference points. The minimum confidentiality level set is 25 and the data item can be used by only tasks $T_1$ and $T_2$. These are set by company $C_1$, since $D_{11}$ belongs to it.
- {$D_{12}$, 20,35,{ }}: this specifies that data item $D_{12}$ has been allocated 20 confidentiality preference points and the minimum confidentiality level set is 35. However, company $C_1$ has set that the data item cannot be used by any tasks of virtual organization 104. The reason for this may be that the data item could refer to some component of the dishwasher (e.g. design of the rotating spray arms) that does not need to be integrated directly with the water heating element or a water pump, and hence does not need to be used by the tasks defined in virtual organization 104.
- {$D_{13}$, 20,50,{$T_1$}}
- {$D_{14}$, 10,50,{$T_2$}}

Note that, for the above four data items, the sum of the second element of the set is 100. This is as per the requirement that the sum of the confidentiality preference points is 100.

- {$D_{14}$, 10,50,{$T_2$}}
- {$D_{21}$, 50,50,{$T_3,T_5,T_6$}}
- {$D_{22}$, 10,15,{$T_5$}}
- {$D_{23}$, 10,70,{$T_3$}}
- {$D_{24}$, 25,10,{$T_3,T_4,T_5,T_6$}}
- {$D_{25}$, 5,10,{ }}
- {$D_{31}$, 30,50,{ }}
- {$D_{32}$, 70,60,{$T_1,T_3,T_5$}}
- {$D_{41}$, 40,70,{$T_2,T_4,T_6$}}
- {$D_{42}$, 50,45,{$T_2,T_4,T_6$}}
- {$D_{43}$, 10,15,{ }}

The information utility sub-policy may be jointly created by the members of virtual organization 104 for each task. For a specific task $T_k$, this policy may specify the following:

- A set of data items {$D_{ij}$}, where $1 \leq i \leq n$ and $1 \leq j \leq p$ that are required by the task.
- For each data item $D_{ij}$ required by the task, the information utility sub-policy may also specify:
  - The task's preference for information utility for data item $D_{ij}$. In order to complete a task, some data items may be more important than other data items, depending on the way in which the accuracy of a given data item impacts on the final result. Therefore, a data item that most significantly impacts on the result of a given task may have the highest preference. Hence, the information utility aspect (e.g. accuracy) of such a data item should be preserved as much as possible. To do this, 100 information utility preference points are allocated across all its data items such that:
    - Those data items that are more useful to the task are allocated a higher number of points, and
    - All 100 information utility preference points are allocated.
  - The minimum level of information utility required $Iu(D_{ij})$ by the task for data item. The minimum level is used to determine if the data item should be extracted or not. If the utility level does not meet the minimum level, then the data items that are extracted may not meet the task's utility requirements.

In one embodiment, the information utility sub-policy format is:

{Task Number, { data item used by task, the associated information utility preference points allocated to the data item, minimum information utility required by the task for the given data item}
}

In this example, the information utility sub-policy is set as follows:

- {$T_1$,{$D_{11}$,20,25},{$D_{13}$,60,25},{$D_{32}$, 20,80}} This implies that task $T_1$ requires data items $D_{11},D_{13},D_{32}$. The information utility preference points allocated to these data items are, respectively, 20, 60, and 20 (which adds up to 100). The minimum information utility levels required by the task for these data items are, respectively: 25, 25, and 80.
- {$T_2$,{$D_{14}$,40,30},{$D_{41}$,40,10},{$D_{42}$,20,20}}
- {$T_3$,{$D_{21}$,10,25},{$D_{23}$,50,25},{$D_{24}$,20,40},{$D_{32}$,20,10}}
- {$T_4$,{$D_{24}$,40,30},{$D_{41}$, 40,10},{$D_{42}$,20,20}}
- {$T_5$,{$D_{21}$,20,20},{$D_{22}$,60,10},{$D_{32}$,20,10}}
- {$T_6$,{$D_{21}$,10,30},{$D_{24}$,30,30},{$D_{41}$,40,10},{$D_{42}$,20,20}}

With the sharing policy created, an example of how the sharing policy is used in virtual organization 104 will now be described. In operation, a task $T_2$ is to be performed in virtual organization 104. This task has with it its information utility policy, namely: {$T_2$,{$D_{14}$,40,30},{$D_{41}$,40,10},{$D_{42}$,20, 20}}.

Conflict control sub-component 204 then determines if the task can be carried out in such a way that conflict of interest is prevented. The task requires data items from companies $C_1$ and $C_4$. The conflict control sub-policies of these companies are retrieved, which are:

{$C_1$,{$C_2$}}, and
{$C_4$,{ }}

Conflict control sub-component 204 determines if there is a conflict of interest. In this case, there is not a conflict as companies $C_1$ and $C_4$ have not specified each other as conflicting. Thus, the request for the task's data is granted.

Information extraction sub-component 206 then retrieves the confidentiality sub-policy of each data item required by task $T_2$. These are:

{$D_{14}$, 10,50,{$T_2$}},
{$D_{41}$, 40,70,{$T_2,T_4,T_6$}}, and
{$D_{42}$, 50,45,{$T_2,T_4,T_6$}}

The Information utility of the task is also retrieved, which is:

{$T_2$,{$D_{14}$,40,30},{$D_{41}$,40,10},{$D_{42}$,20,20}}

The optimum levels of information utility and confidentiality of each data item are determined. In one example, given a task with z data items, the optimum balance between confidentiality and information utility is determined by solving the following optimization problem:

$$\text{maximize } U(x_1, \ldots, x_z, y_1, \ldots, y_z)$$

$$\text{subject to: } \frac{1}{q_1}x_1 + \ldots + \frac{1}{q_z}x_z + \frac{1}{r_1}y_1 + \ldots + \frac{1}{q_z}y_z = 1$$

$x_i \geq 0$ for $1 \leq i \leq z$ (i.e. the optimum information utility level of a data item cannot be negative)

$x_i \geq$ minimum level of information utility required by the task for the i-th data item used by the given task, for $1 \leq i \leq n$ $y_i \geq 0$ for $1 \leq i \leq z$ (i.e. the optimum confidentiality level of a data item cannot be negative)

$y_i \geq$ minimum level of confidentiality required (specified by the company to which the data item belongs) of the i-th data item used by the given task, for $1 \leq i \leq z$ Where:

$x_1, \ldots, x_z$ are the information utility levels of the different data items used by the given task, $y_1, \ldots, y_z$ are the confidentiality levels of the different data items used by the given task, $q_i$ is the number of information utility preference points allocated to i-th data item used by the given task, $r_i$ is the number of confidentiality preference points allocated to i-th data item used by the company to which the data belongs, The function U is defined as $$U(x_1, \ldots, x_z, y_1, \ldots, y_z) = \left(\prod_{i=1}^{z} x_i^{\frac{q_i}{100}}\right)^{\alpha} \left(\prod_{i=1}^{z} y_i^{\frac{r_i}{100}}\right)^{\beta}$$

where:

The preference between information utility and confidentiality is set before the task is executed, where $\alpha$ is the preference value for information utility, $\beta$ is the preference value for confidentiality, $\alpha + \beta = 1$ I is defined as the sum of the amount of information stored in the data items required by the given task.

In one embodiment, for the specific example, the following optimization problem is solved:

--- maximize $U(x_1, x_2, x_3, y_1, y_2, y_3)$
(where $x_1 = \text{Iu}(D_{14})$, $x_2 = \text{Iu}(D_{41})$, $x_3 = \text{Iu}(D_{42})$;
$y_1 = \text{Conf}(D_{14})$, $y_2 = \text{Conf}(D_{41})$, $y_3 = \text{Conf}(D_{42})$
)

--- subject to:

$$\frac{1}{40}x_1 + \frac{1}{40}x_2 + \frac{1}{20}x_3 + \frac{1}{10}y_1 + \frac{1}{40}y_2 + \frac{1}{50}y_3 =$$

$$\text{Info}(D_{14}) + \text{Info}(D_{41}) + \text{Info}(D_{42})$$

$x_1 \geq 0; x_1 \geq 30$ $x_2 \geq 0; x_2 \geq 10$ $x_3 \geq 0; x_3 \geq 20$ $y_1 \geq 0; y_1 \geq 50$ $y_2 \geq 0; y_2 \geq 70$ $y_3 \geq 0; y_3 \geq 45$ Once the above optimization problem is solved, the values obtained for $x_1, x_2, x_3, y_1, y_2, y_3$ are the optimum information utility and confidentiality levels for data items $D_{14}, D_{41}, D_{42}$, respectively.

Information extraction sub-component 206 then extracts the required data items from the different companies in such a way as to obtain the required optimum levels of information utility and confidentiality of each data item, as obtained above. The data items are extracted based on the optimum information utility and confidentiality levels for data items $D_{14}, D_{41}, D_{42}$. For example, based on the optimum information utility and confidentiality levels for data items $D_{14}, D_{41}, D_{42}$, perturbative and/or non-perturbative confidentiality-preserving data extraction techniques can be used to ensure that the data items possess the calculated optimum levels of information utility and confidentiality. Perturbative techniques use mathematical methods that are used to find an approximate solution to data item extraction by starting from the exact solution of a related problem. Information extraction sub-component 206 then passes the extracted data items back to task $T_2$.

Particular embodiments provide many advantages. For example, the sharing of member information is determined at an optimum balance between confidentiality and information utility. Particular embodiments ensure that the confidentiality (privacy) of the shared information is preserved. Also, particular embodiments extract parts of confidential and sensitive data to reduce its sensitivity. This is done to an optimal level where the shared information's confidentiality is preserved while at the same time information remains useful and provides value to the requester of the information.

Also, the confidentiality of the shared information is preserved and the information is still sufficiently suitable for the purpose for which it is shared. Particular embodiments ensure that the information shared will be useful for the task of virtual organization 104 while ensuring the confidentiality of each member's information.

Also, access control is combined with confidentiality. Controlling access for protecting the confidentiality of information may hinder the sharing of information. For example, a design of a component may be of a highly sensitive nature and its owner does not want to share it with other members of virtual organization 104. However, certain aspects of the components designed may need to be shared with other members 106 of virtual organization 104. This sharing is asserted to ensure that the component is properly integrated into the design of the overall product. Therefore, there is a need to ensure that certain details of a component's design are shared, but in such a way that the confidentiality of the overall design is preserved. The confidentiality sub-policy and conflict control sub-policy and information utility sub-policy may be set to allow this type of sharing.

Also, the particular embodiments also offer the ability to adopt the policies dynamically or on the fly at run time. This allows the sharing and exchange of information while avoiding conflicts of interest in a dynamically-controlled manner. Also, dynamic adaptation of access roles based on evolving business requirements is provided. For example, the conflict control sub-policy may be adapted based on the definition of conflicts in the access control policies. Also, an indirect conflict of interest may be used that may investigate all possible relationships between all members 106 participating in virtual organization 104. The potential conflict of interest between participating companies in virtual organization 104 may be altered at run time.

Figure 5:
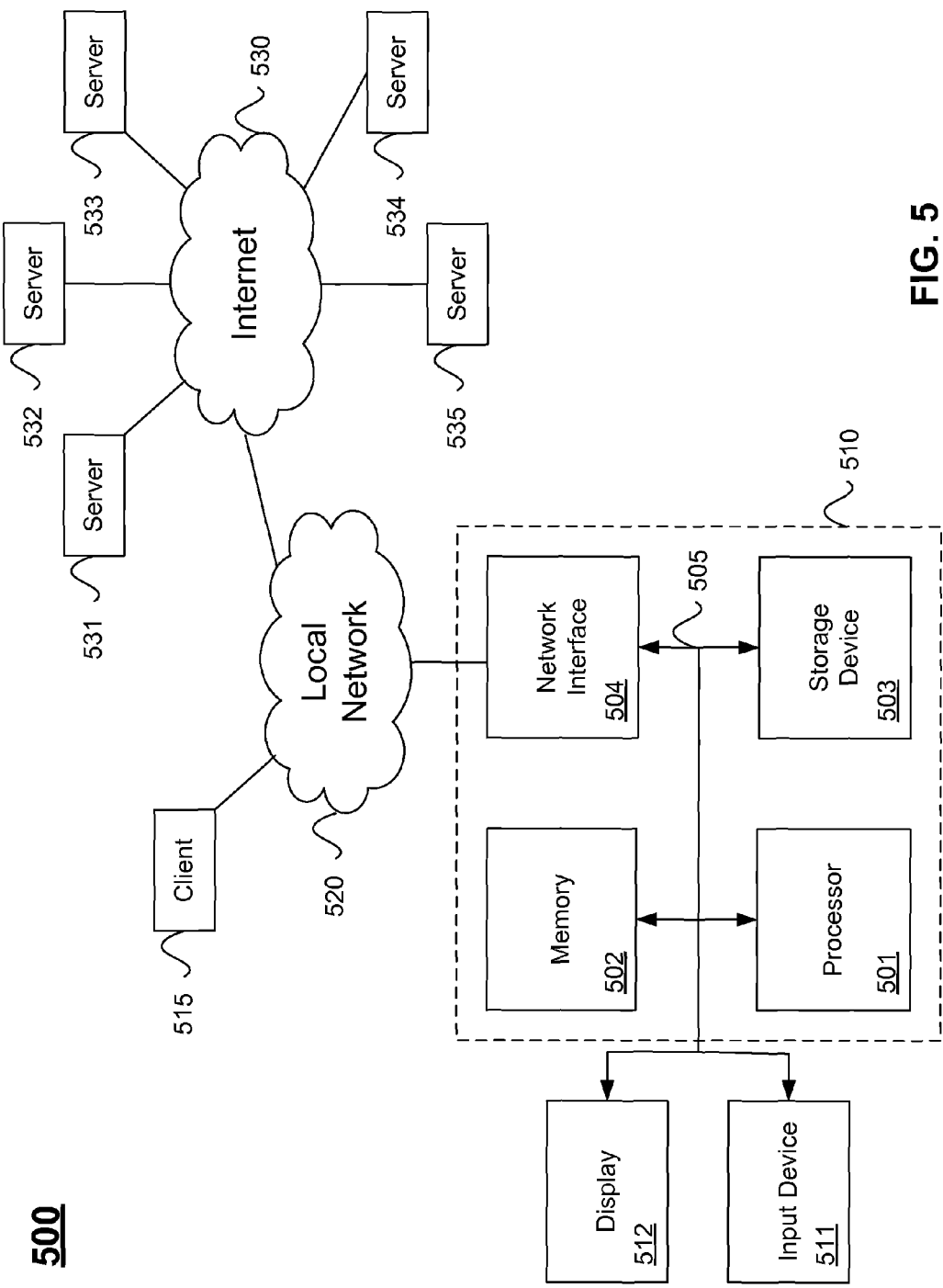
FIG. 5 illustrates hardware of a special purpose computing machine configured to provide controlled sharing of information according to one embodiment.

FIG. 5 illustrates hardware of a special purpose computing machine configured to provide controlled sharing of information according to one embodiment. An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable storage mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information through the network interface 504 across a local network 520, an Intranet, or the Internet 530. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

Particular embodiments may be implemented in a computer-readable storage medium for use by or in connection with the instruction execution system, apparatus, system, or machine. The computer-readable storage medium contains instructions for controlling a computer system to perform a method described by particular embodiments. The instructions, when executed by one or more processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
    determining, by a computing device, a set of confidentiality sub-policies associated with a set of data items, wherein the set of confidentiality sub-policies specifies confidentiality values for the set of data items, and wherein different confidentiality values represent different levels of confidentiality;
    determining, by the computing device, an information utility sub-policy associated with a task being performed by a virtual organization including a plurality of members, wherein the information utility sub-policy specifies information utility values for data items in the set of data items associated with the task, and wherein different information utility values represent different levels of utility to enable execution of the task;
    performing, by the computing device, an analysis that optimally balances the confidentiality values and the information utility values specified in the set of confidentiality sub-policies and the information utility sub-policy to determine at least a portion of the set of data items associated with a first member in the plurality of members; and
    providing, by the computing device, the at least a portion of the set of data items to a second member such that the second member can execute the task using the retrieved at least a portion of the set of data items, wherein the analysis balances preserving confidentiality while ensuring that the at least a portion of the set of data items provided to the second member are useful to execute the task.

2. The method of claim 1, further comprising:
    determining a set of conflict control sub-policies for members associated with the set of data items and the first member associated with the task; and
    determining when a conflict exists between members associated with the set of data items and the first member using the set of conflict control sub-policies,
    wherein the at least a portion of the set of data items are not retrieved when the conflict exists.

3. The method of claim 2, wherein the set of conflict control sub-policies includes a conflict control sub-policy associated with each of the members associated with the set of data items and a conflict control sub-policy associated with the first member.

4. The method of claim 1, further comprising determining an optimum level of information utility and confidentiality based on the set of confidentiality sub-policies and the information utility sub-policy for the task.

5. The method of claim 4, wherein the optimum level of information utility and confidentiality is determined using an optimization function.

6. The method of claim 4, further comprising determining at least a portion of the set of data items to extract based on a maximum level determined.

7. The method of claim 1, wherein the confidentiality of each data item is quantified based on a pre-condition defined for the confidentiality sub-policy.

8. The method of claim 1, wherein the information utility for each data item associated with the task is quantified based on a pre-condition defined for the confidentiality sub-policy.

9. The method of claim 1, further comprising dynamically changing at least one sub-policy in the set of confidentiality sub-policies or the information utility sub-policy.

10. The method of claim 1, wherein the set of confidentiality sub-policies and the information utility sub-policy are defined by a single policy used to control sharing of the set of data items.

11. A non-transitory computer-readable storage medium containing instructions for controlling a computer system to be configured to:
   determine a set of confidentiality sub-policies associated with a set of data items, wherein the set of confidentiality sub-policies specifies confidentiality values for the set of data items, and wherein different confidentiality values represent different levels of confidentiality;
   determine an information utility sub-policy associated with a task being performed by a virtual organization including a plurality of members, wherein the information utility sub-policy specifies information utility values for data items in the set of data items associated with the task, and wherein different information utility values represent different levels of utility to enable execution of the task;
   perform an analysis that optimally balances the confidentiality values and the information utility values specified in the set of confidentiality sub-policies and the information utility sub-policy to determine at least a portion of the set of data items associated with a first member in the plurality of members; and
   provide the at least a portion of the set of data items to a second member such that the second member can execute the task using the retrieved at least a portion of the set of data items, wherein the analysis balances preserving confidentiality while ensuring that the at least a portion of the set of data items provided to the second member are useful to execute the task.

12. The non-transitory computer-readable storage medium of claim 11, further configured to:
   determine a set of conflict control sub-policies for members associated with the set of data items and the first member associated with the task;
   determine when a conflict exists between members associated with the set of data items and the first member using the set of conflict control sub-policies,
   wherein the at least a portion of the set of data items are not retrieved when the conflict exists.

13. The non-transitory computer-readable storage medium of claim 12, wherein the set of conflict control sub-policies includes a conflict control sub-policy associated with each of the members associated with the set of data items and a conflict control sub-policy associated with the first member.

14. The non-transitory computer-readable storage medium of claim 11, further configured to determine an optimum level of information utility and confidentiality based on the set of confidentiality sub-policies and the information utility sub-policy for the task.

15. The non-transitory computer-readable storage medium of claim 14, wherein a maximum level is determined using an optimization function.

16. The non-transitory computer-readable storage medium of claim 14, further configured to determine the at least a portion of the set of data items to extract based on the optimum level determined.

17. The non-transitory computer-readable storage medium of claim 11, wherein the confidentiality of each data item is quantified based on a pre-condition defined for the confidentiality sub-policy.

18. The non-transitory computer-readable storage medium of claim 11, wherein the information utility for each data item associated with the task is quantified based on a pre-condition defined for the confidentiality sub-policy.

19. A system comprising:
   a storage device configured to store:
   data items for each member, and
   a non-transitory computer-readable storage medium containing instructions for controlling a computer system to be configured to:
   determine a set of confidentiality sub-policies associated with a set of data items, wherein the set of confidentiality sub-policies specifies confidentiality values for the set of data items, and wherein different confidentiality values represent different levels of confidentiality;
   determine an information utility sub-policy associated with a task being performed by a virtual organization including a plurality of members, wherein the information utility sub-policy specifies information utility values for data items in the set of data items associated with the task, and wherein different information utility values represent different levels of utility to enable execution of the task;
   perform an analysis that optimally balances the confidentiality values and the information utility values specified in the set of confidentiality sub-policies and the information utility sub-policy to determine at least a portion of the set of data items associated with a first member in the plurality of members; and
   provide the at least a portion of the set of data items to a second member such that the second member can execute the task using the retrieved at least a portion of the set of data items, wherein the analysis balances preserving confidentiality while ensuring that the at least a portion of the set of data items provided to the second member are useful to execute the task.

20. The system of claim 19, wherein the instructions are further configured to:
   determine a set of conflict control sub-policies for members associated with the set of data items and the first member associated with the task; and
   determine when a conflict exists between members associated with the set of data items and the first member using the set of conflict control sub-policies,
   wherein the at least a portion of the set of data items are not retrieved when the conflict exists.

* * * * *